(No Model.) 2 Sheets—Sheet 1.
C. T. EMERSON.
SAFETY GUARD FOR CAR TRUCKS.
No. 273,973. Patented Mar. 13, 1883.
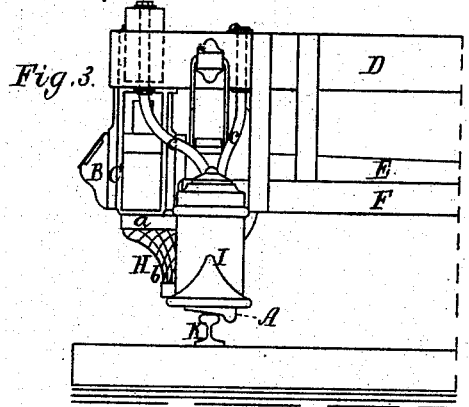
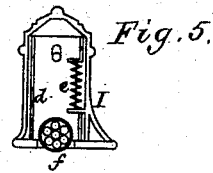
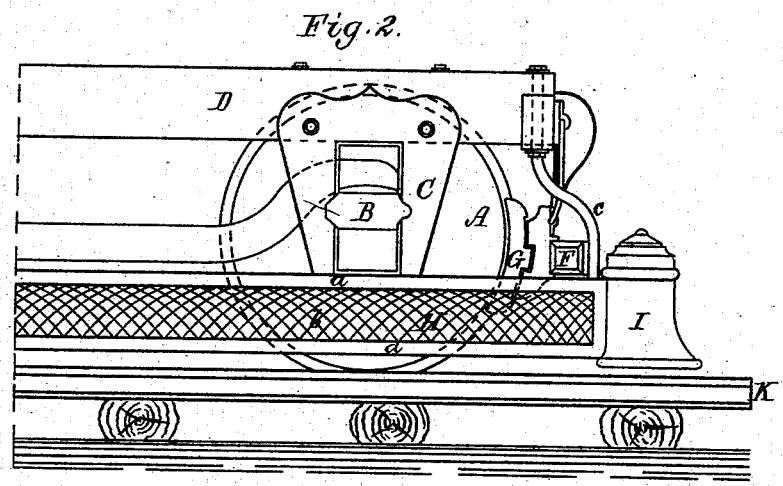
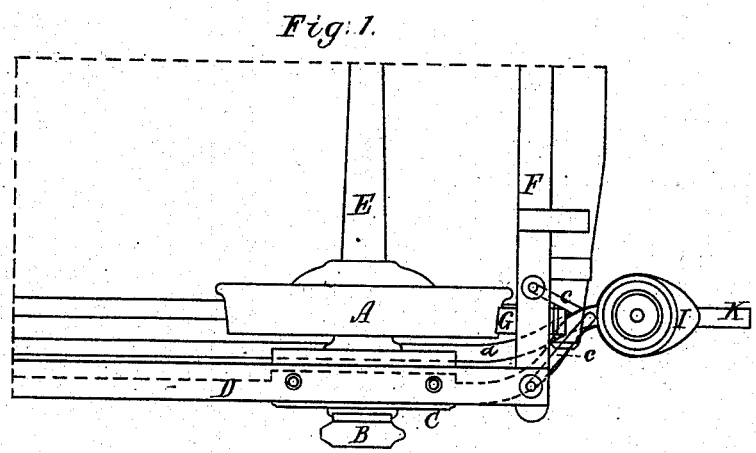
Witnesses
Inventor
Chas. Theodore Emerson
by R. H. Eddy, att'y.

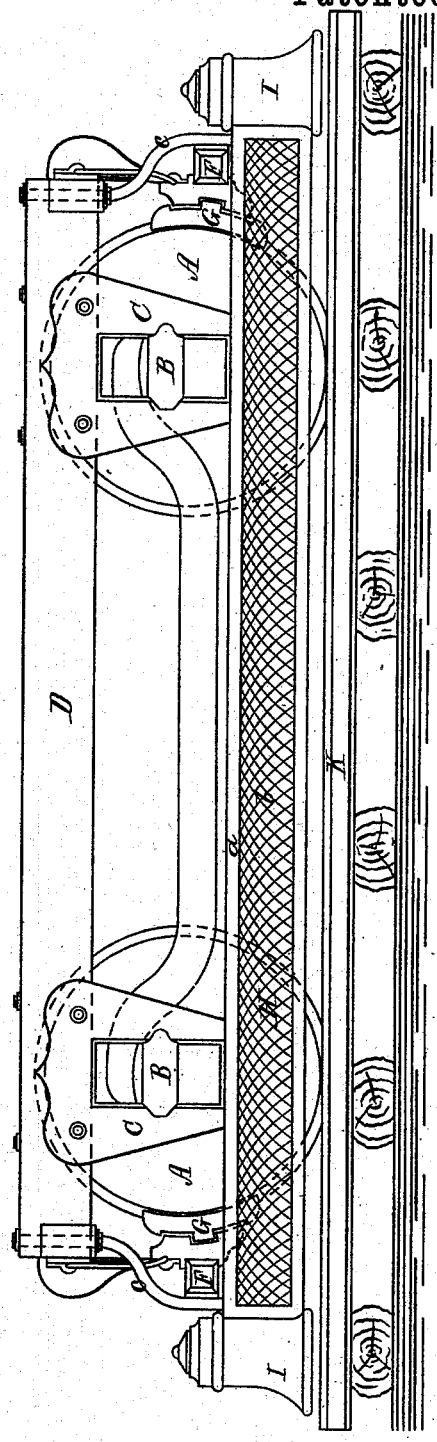

UNITED STATES PATENT OFFICE.

CHARLES T. EMERSON, OF LAWRENCE, MASSACHUSETTS.

SAFETY-GUARD FOR CAR-TRUCKS.

SPECIFICATION forming part of Letters Patent No. 273,973, dated March 13, 1883.

Application filed January 23, 1883. (No model.)

*To all whom it may concern:*

Be it known that I, CHARLES THEODORE EMERSON, of Lawrence, in the county of Essex, of the Commonwealth of Massachusetts, have invented a new and useful Improvement in Safety-Guards for Railway-Car Trucks; and I do hereby declare the same to be described in the following specification and represented in the accompanying drawings, of which—

Figure 1 is a top view, Fig. 2 a side elevation, and Fig. 3 an end view, of part of a railway-car truck provided with my invention, the nature of which is defined in the claims hereinafter presented. Fig. 4 is a top view, and Fig. 5 a vertical section, of the deflecting-head of the safety-guard. Fig. 6 is a side elevation of an entire truck, showing the fender and its bell-shaped deflectors as applied thereto.

My improved safety-guard is applied in front and in rear and aside of the two side wheels of a car-truck. It also extends underneath and below the supporters of the journal-boxes of the wheels, and is or may be attached to such supporters.

In each of the Figs. 1, 2, and 3 of the drawings but one of the car-wheels and the adjacent part or parts of the truck are represented. In such drawings, A denotes the wheel, and B one of its journal-boxes, while C is the supporter of such box, such supporter extending downward from the truck-frame D. The axle of the wheel is represented at E in Figs. 1 and 3, the brake-bar at F, and one of its brakes at G, all being constructed and arranged in the usual manner.

My aforesaid safety-guard is to prevent a person from being caught between a wheel and a rail, and injured or crushed by the wheel while in motion on the rail; and said safety-guard consists not only of a side fender, H, but of a vertically-movable deflecting and bell-formed head, I, applied to each end of such fender, the whole being formed so that while the fender may be aside of two side wheels of the truck they (the said wheels) may be directly between the two deflecting-heads I, and these latter be directly over the rail K.

In the drawings, H denotes the fender, consisting of a suitable frame, $a$, and rods or wires $b$, arranged across it in manner as shown. This fender is held in place at each end portion of it by rods $c$, extending down from the truck-frame, and such fender has fixed to each end of it a hollow cylinder, $d$, which is encompassed by the bell-shaped guard or deflector I, which is adapted to slide vertically on the said cylinder $d$, and to be pressed downward by a spring, $e$, arranged within and applied to the said cylinder and deflector in manner as shown in Fig. 5. A wheel, $f$, to rest on the tread of the rail, is adapted to the deflector I, and such deflector is slotted vertically to enable it to move vertically relatively to the fender and the cylinder $d$, projecting therefrom. The wheel $f$ is shown as resting on the rail. It may, however, stand a little above the rail, so as to be forced down thereupon when the deflector may be carried against a person or thing, the object of the wheel being to prevent the deflector from being borne down upon the rail, so as to injure it or produce friction on it to retard the movement of the truck. The fender and each of the cylinders $d$ move vertically with the truck-frame, the cylinders at the same time moving within the bell-shaped deflectors I, which by their springs are pressed down so that their wheels rest on the railway-rail. From this it will be seen that should a person, while the truck may be running on the rail, get in advance of the deflector I, he will, by it and the fender, be prevented from getting caught between and injured by the wheel and rail.

I claim—

1. The combination of the railway-truck with a fender, H, arranged aside of the side wheels of such truck, and with a bell-shaped deflector, I, adapted to such fender, at each end thereof, and arranged with the truck-wheel and provided with a bearing-wheel to run on the railway, all being substantially as set forth.

2. The combination of the bell-shaped deflector with its supporting cylinder and spring, and with the fender extending from such cylinder, as described.

3. The combination of the bell-shaped deflector and its sustaining-wheel with the supporting cylinder and spring arranged within such deflector, and with a fender extending from the said cylinder, as explained.

CHAS. THEODORE EMERSON.

Witnesses:
R. H. EDDY,
E. B. PRATT.